Figure 1:
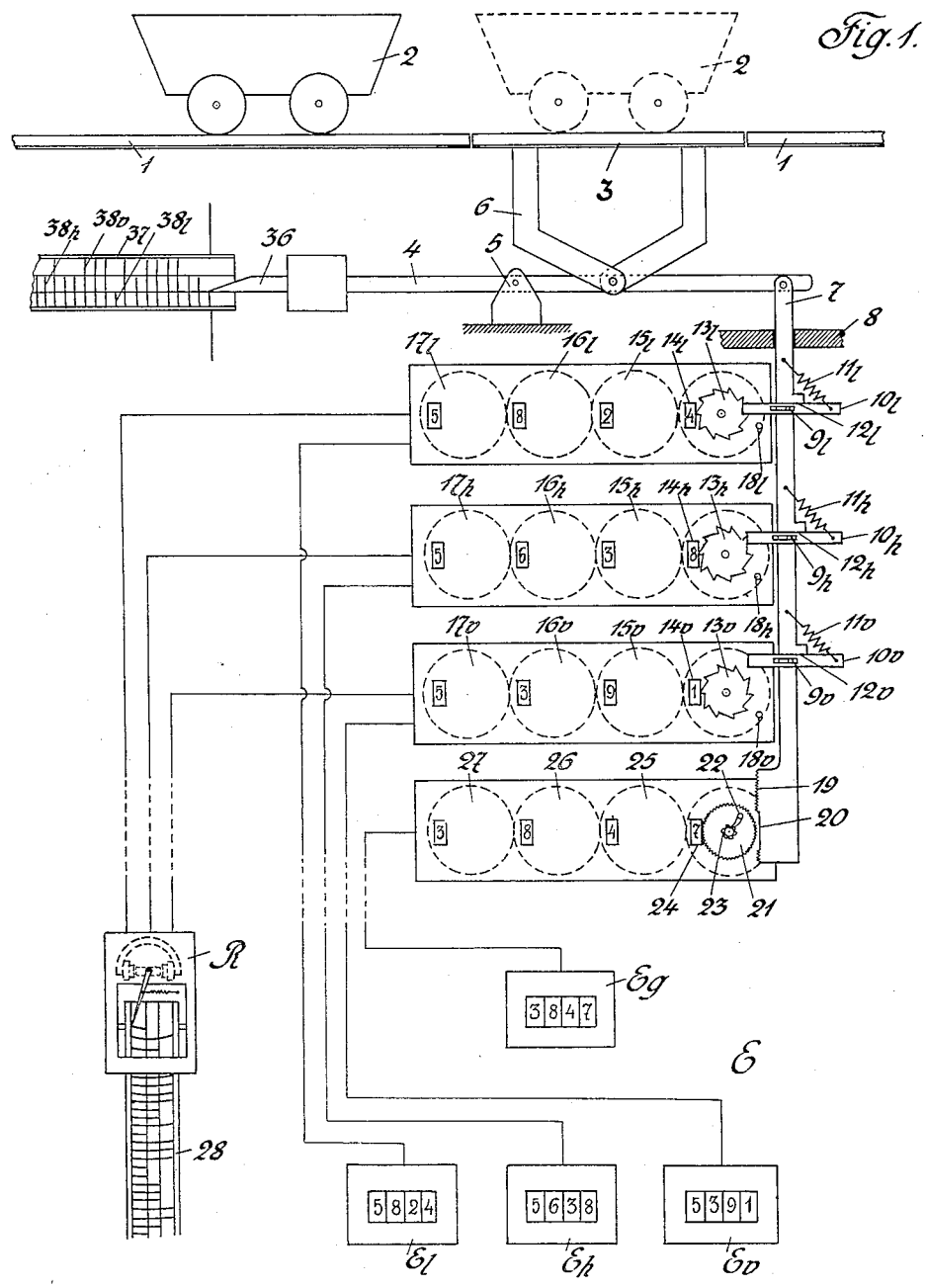

Nov. 4, 1924.

R. HEINOLD 1,513,811

DEVICE FOR COUNTING DIFFERENTLY LOADED VEHICLES

Filed March 6, 1923     2 Sheets-Sheet 1

Inventor
Robert Heinold
by Knight Bros
attorneys

Nov. 4, 1924.　　　　　　　　　　　　　　　1,513,811
R. HEINOLD
DEVICE FOR COUNTING DIFFERENTLY LOADED VEHICLES
Filed March 6, 1923　　　2 Sheets-Sheet 2

Inventor
Robert Heinold
by Knight Bro
attorneys

Patented Nov. 4, 1924.

1,513,811

UNITED STATES PATENT OFFICE.

ROBERT HEINOLD, OF KIEL, GERMANY.

DEVICE FOR COUNTING DIFFERENTLY-LOADED VEHICLES.

Application filed March 6, 1923. Serial No. 623,242.

*To all whom it may concern:*

Be it known that I, ROBERT HEINOLD, citizen of the German Republic, and residing at Kiel, State of Prussia, Germany, have invented certain new and useful Improvements in Devices for Counting Differently-Loaded Vehicles, of which the following is a specification.

This invention relates to methods and devices for counting differently loaded vehicles such as railway trucks, mine trucks and the like.

In railway systems, mines, power stations, etc., it is often desirable to possess information as to the quantity of material such as fuel received or used and delivered, and particularly to check the number of trucks or waggons passing in and out and the extent to which they are loaded. Devices have already been proposed for counting trucks and weighing the same. In the known counting devices a switch for giving an indication at a distance is actuated by the pressure of the wheels, or suitable mechanism is actuated by the wheel itself. Automatic weighing devices for freight cars have also been proposed.

This invention relates to a method of recording the number of trucks and to what extent they are loaded at a point located at a distance from the track. This object is accomplished by utilizing the depressions or deflections of a weighing platform as a means for controlling the counting, weighing and transmitting mechanism or arrangements. The operation of counting the trucks depends on the number of depressions of the platform, while for ascertaining the extent of their load the magnitude of the depressions is essential. Both the number of the depressions and their magnitudes are transmitted to a distant point or station and this is accomplished in accordance with the invention with the aid of a transmitter and receiver system of the kind used for transmitting any other functions, as for example signals or orders, or such as are used in mine signalling apparatus water level indicators and the like.

Another feature of the invention consists in providing different transmitter systems adapted to be affected by platform depressions of different magnitudes and to cause these systems to control receiving apparatus at a distant place in such a way as to register the numbers of trucks of different categories, i. e. the numbers of trucks loaded to different extents. By this means it is possible to count both the total number of trucks that have passed over the platform and also to group the trucks according to the weights of their loads. The counting operation may be effected by a counting train driven step by step and provided with a unit wheel, tens wheel, and so on as in a conventional counter. Another feature of the invention comprises means for recording the loads of the various trucks and the time intervals between the various recording operations so that all of the operations may be subsequently checked.

A device for carrying out the counting and recording methods according to the invention is illustrated diagrammatically in the drawing in which—

Figure 2:
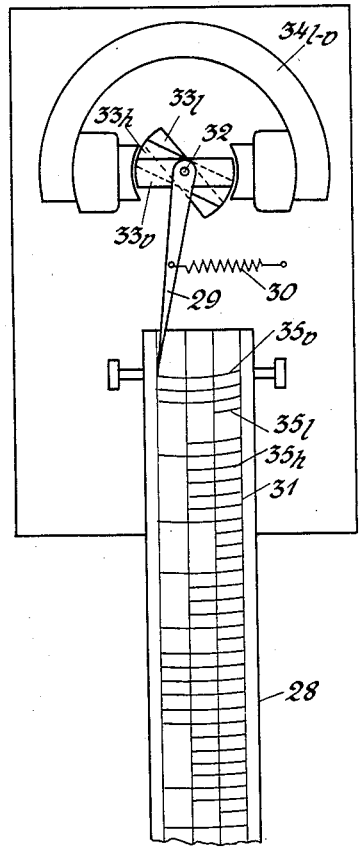

Fig. 1 is a diagram of a complete installation, showing an arrangement for counting differently loaded trucks and for transmitting the result to a distant point or points; and Fig. 2 is an elevation of a recording device with a recording stylus on an enlarged scale.

For the sake of simplicity I have described and illustrated as an example a counting device recording only empty, half full and full trucks, which is sufficient for instance for mining operations. It is obvious that, by adding a sufficient number of intermediate counting mechanisms, the weight of the loaded trucks may be determined more exactly. Moreover in order to reconcile the terms "half full" and "full" with the weight, it must of course be assumed that goods or materials of the same kind are conveyed such as is the case in mines where the number of truck loads of coal or ore passing out of the mine are to be determined by number and weight.

In the railway track 1 shown in Fig. 1, and on which a waggon or truck 2 is represented, a weighing platform 3 is interposed which is connected by two arms 6 to a two armed balance lever or beam 4 pivoted on a fixed pivot 5. The arm of the beam 4 connected to arms 6 is also connected to a vertical rod or bar 7 which passes through an opening in a casing, of which a part 8 is shown in the drawing, this casing containing the counting and transmitting devices shown below. Mounted on pins of the bar 7 are slotted arms $10_1$, $10_h$, $10_v$ each of which is caused respectively by a spring $11_I$, $11_h$, $11_v$ to bear respectively against a stop $12_I$, $12_h$, $12_v$ and to thus normally assume a horizontal position and to go as far towards the left as the respective slot $9_I$, $9_h$, $9_v$ in the particular bar will permit.

The pull exerted by the springs $11_I$, $11_h$, $11_v$ causes the arms $10_I$, $10_h$, $10_v$ to bear against the ratchet wheels $13_I$, $13_h$, $13_v$ which, when they are turned a certain distance, shift the units disks of their counting trains on by one unit. The number of the unit is displayed behind an opening $14_I$, $14_h$, $14_v$. When a units disk has been advanced ten steps or units, a tooth or the like advances respectively the tens disk $15_I$, $15_h$, $15_v$, and whenever a tens disk has been advanced ten steps a hundreds disk $16_I$, $16_h$, $16_v$ is advanced one step, and finally ten steps of a hundreds disk result in the advancing of a thousands disk $17_I$, $17_h$, $17_v$. The units disks $13_I$, $13_h$, $13_v$ are advanced when the bar 7 is moved downwards. When the bar 7 is thus moved the arms $10_I$, $10_h$, $10_v$ strike against stops $18_I$, $18_h$, $18_v$. These stops are all at equal distances from the horizontal lines extending through the centres of the counting train disks, but the distances of the arms $10_I$, $10_h$, $10_v$ from the horizontal lines are different. The lower edge of the arm $10_I$ coincides with the corresponding line through the centres of its counting train disks, while the arm $10_h$ is a certain distance above the corresponding horizontal line, and the arm $10_v$ is about twice as far from the horizontal central line of its train as $10_h$. On account of these different spacings the ratchet wheel $13_I$ is advanced as soon as the bar 7 commences moving downward, but the disk $13_h$ is not advanced until the bar 7 is depressed further a certain distance, and in the case of the wheel $13_v$ no advancing occurs until its corresponding arm $10_v$ has been moved down by the bar 7 to twice the distance, necessary to advance disk $13_h$. After the bar 7 moves down a certain distance each of the arms strikes against its corresponding fixed stop $18_I$, $18_h$, $18_v$. The respective feeding motion is then terminated, each of the arms $10_I$, $10_h$, $10_v$ being respectively detained and assuming an oblique position if the bar 7 executes a further downward movement. When the bar 7 rises again after the completion of the weighing and counting operation the arms $10_I$, $10_h$, $10_v$ go back into their horizontal positions, the springs $11_I$, $11_h$, $11_v$ restoring them so that when the bar 7 is depressed again the disks will be further advanced. By such deflection for instance of arm $10_I$ its spring $11_I$ is put under tension and thus the feeding motion of arm $10_h$ upon its disk occurs against the tension of spring $11_I$ which is suitably dimensioned to yield at a given weight, for instance the weight of one half truck load of a given material. In case of a full truck load also the tension of spring $11_h$ is overcome and arm $10_v$ is now enabled to feed disk 13 one step against the cumulative tension of springs $11_I$ and $11_h$.

It will be obvious that according to whether the trucks are more or less heavily loaded the one or the other of the ratchet wheels will be advanced and the relations of the parts in the present example is such that the wheel $13_I$ will count the empty trucks, the wheel $13_h$ the half-loaded trucks and the wheel $13_v$ the fully loaded trucks. Of course the fully loaded trucks will be counted not only by the wheel $13_v$ but also by the wheels $13_h$ and $13_I$ belonging to the counting train for half-loaded trucks and to the train for empty trucks respectively. The number of empty and half-loaded trucks is thus found by subtracting from the total number of trucks the number of fully loaded ones and half loaded ones respectively.

In the illustrated device the bar 7 is extended in a downward direction and this extension is provided with a rack 19, a section 20 of which is devoid of teeth. This rack is adapted to mesh with a toothed wheel 21 provided with a pawl 22 adapted to rotate a wheel 23, this wheel turning the units shaft of a counting train at each downward movement of the bar 7. The counting train is rotated more or less according to the extent of downward movement of the bar 7 and a corresponding weight is thus indicated behind an opening 24. The units indicating or counting train is coupled in the usual manner with a tens, hundreds and thousands indicating mechanism 25, 26 and 27 respectively.

The toothless portion of the rack is provided so that the rack will only commence engaging the toothed wheel 21 when the bar 7 is depressed to a greater extent than is caused by an empty truck, i. e. the bottom counting train serves to indicate the net load units. When the bar 7 moves upward the ratchet 22 slips over the teeth of the wheel 23 so that this wheel is only rotated when the bar 7 is depressed.

The positions of the numeral disks of the counting trains are made visible at a distant receiving station E, an electrical transmitting system or the like of any suitable known kind being employed for this purpose. Therefore the same figures will appear at the various receivers $E_1$ $E_h$ $E_v$ as at the corresponding transmitters associated with the counting trains. The net-weight of the truck loads is also indicated at the receiving station by a receiving instrument $E_g$.

In accordance with the invention the extents to which the trucks are loaded and the order in which the various weighing operations are performed are also recorded, a special recording device R being provided for this purpose and being connected electrically to the counting trains that indicate the numbers of the trucks.

The construction of such a recording device is shown more clearly in Fig. 2. A recording tape 28 is driven by a clock-work (not shown) so as to travel a certain distance per unit of time. A writing lever or stylus 29 is arranged to inscribe marks on the tape. When the stylus 29 is held in its right hand normal position, by a spring 30 it produces a line 31 which extends parallel to the edges of the tape 28. The stylus 29 is fixed on a shaft 32 on which also three armatures $33_l$, $33_h$, $33_v$ are fixed and which are displaced at equal angles relatively to each other. Each armature is acted upon by corresponding electromagnets $34_{l-v}$ (shown in this figure behind each other so that only $34_v$ is visible) and each of these magnets is energized when its circuit is closed by the movement of one of the ratchet wheels $13_l$, $13_h$, $13_v$. Such a circuit closing means being obvious to anyone skilled in the art, detail illustration thereof is omitted. Accordingly as one or the other magnet is energized the corresponding armature is moved out of its normal position into the field direction of its corresponding electromagnet and the stylus 29 is deflected accordingly. The arrangement is such that the smallest deflection takes place when the electromagnet $34_l$ is energized, a larger deflection resulting from the energization of the electromagnet $34_h$ and the largest deflection being caused by the energization of the magnet $34_v$. It will thus be seen that the arcs $35_l$, $35_h$, $35_v$ marked on the tape 28 always show the size of the load of the truck which was on the weighing platform at the particular moment when the stylus 29 was deflected. The sequence between the different arms on the recording tape indicate the order in which the various weighing operations took place.

If desired a corresponding local registration may be effected at the same time by purely mechanical means. This may be accomplished by providing a pen or stylus 36 on the free end of the balance beam 4 and by arranging this pen so as to produce arcs $38_l$, $38_h$, $38_v$ on a tape 37 moved by a clockwork and adapted to show similarly as described before the number of trucks of the different weights and the order in which the various trucks were passed over the platform. According to whether the weighing platform sinks more or less under the weight of a truck the stylus 36 will be deflected more or less and produce the various arcs $38_l$, $38_h$, $38_v$.

I claim:

In a device for registering unloaded and differently loaded trucks for railway or conveyor systems, the combination of a platform adapted to yield to a different extent according to the different weight of the trucks and adapted to be traversed by the trucks, a balancing beam connected to said platform, an actuating member pivotally attached to said beam and adapted to follow the movement of the platform, a plurality of counters adapted to be operated by said actuating member successively, the number of counters operated being in accordance with the extent of the platform depression caused by the truck or truck and load on the platform.

ROBERT HEINOLD.

Witnesses:
ARNEAS MARKA,
EMIL LÜTZ.